(12) United States Patent
Xi et al.

(10) Patent No.: US 7,812,583 B2
(45) Date of Patent: Oct. 12, 2010

(54) MANAGEMENT OF REGULATOR-INDUCED SWITCHING NOISE FOR SAMPLED SYSTEMS

(75) Inventors: Xiaoyu Xi, Plano, TX (US); Shyam S. Somayajula, Austin, TX (US)

(73) Assignee: ST-Ericsson SA, Geneva (CH)

( * ) Notice: Subject to any disclaimer, the term of this patent is extended or adjusted under 35 U.S.C. 154(b) by 0 days.

(21) Appl. No.: 12/420,684

(22) Filed: Apr. 8, 2009

(65) Prior Publication Data

US 2009/0195233 A1 Aug. 6, 2009

Related U.S. Application Data

(62) Division of application No. 11/240,745, filed on Sep. 30, 2005, now Pat. No. 7,535,209.

(51) Int. Cl.
*G05F 1/40* (2006.01)

(52) U.S. Cl. .................................................. 323/282

(58) Field of Classification Search ................. 323/268, 323/271, 282, 285, 299
See application file for complete search history.

(56) References Cited

U.S. PATENT DOCUMENTS

| | | | |
|---|---|---|---|
| 4,606,076 A | 8/1986 | Davis | |
| 4,868,666 A * | 9/1989 | Azumi et al. | 348/348 |
| 5,161,022 A | 11/1992 | Ichimura et al. | |
| 5,214,367 A * | 5/1993 | Uesugi | 318/803 |
| 5,537,305 A | 7/1996 | Colotti | |
| 5,640,315 A * | 6/1997 | Hirano et al. | 363/41 |
| 6,147,526 A | 11/2000 | Skelton et al. | |
| 6,225,795 B1 * | 5/2001 | Stratakos et al. | 323/283 |
| 6,313,616 B1 * | 11/2001 | Deller et al. | 323/282 |

FOREIGN PATENT DOCUMENTS

| | | |
|---|---|---|
| JP | 61254075 | 11/1986 |
| JP | 2001523073 T | 11/2001 |

OTHER PUBLICATIONS

1st Office Action for Chinese Application filing No. 200680035672X with English translation, issue date Aug. 14, 2009, pp. 10.
Office Action for Japanese application No. 2008-533406, dated Aug. 22, 2010, pp. 2.

* cited by examiner

*Primary Examiner*—Matthew V Nguyen
(74) *Attorney, Agent, or Firm*—William J. Kubida; Peter J. Meza; Hogan Lovells US LLP

(57) ABSTRACT

A system includes a sampler to sample an input voltage and a switching regulator. The switching regulator is adapted to regulate a switching operation of the regulator in response to the sampling by the sampler.

21 Claims, 4 Drawing Sheets

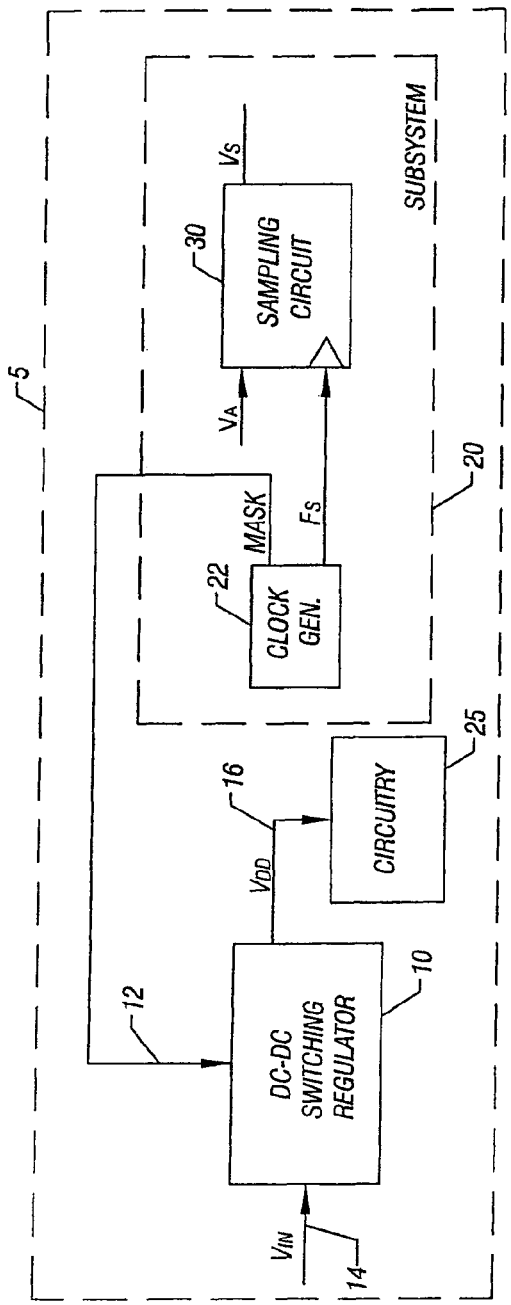
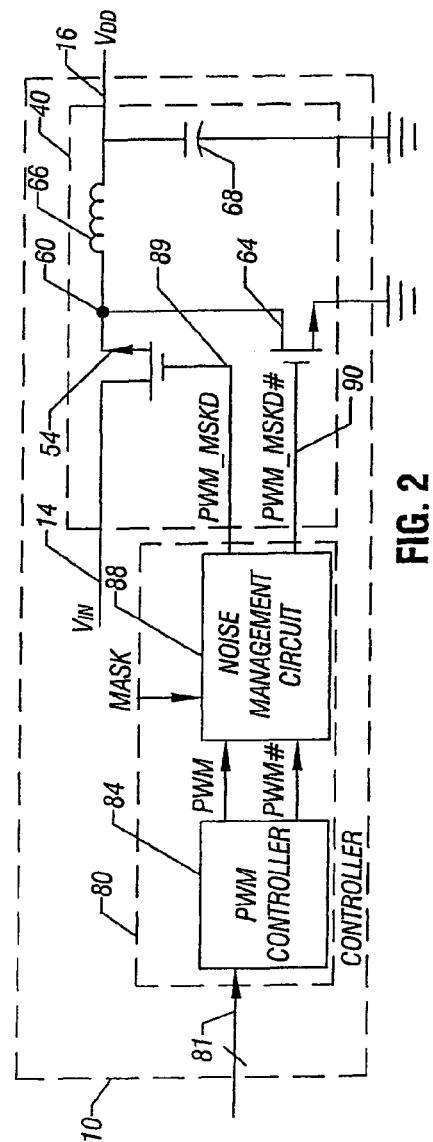
FIG. 1
FIG. 2

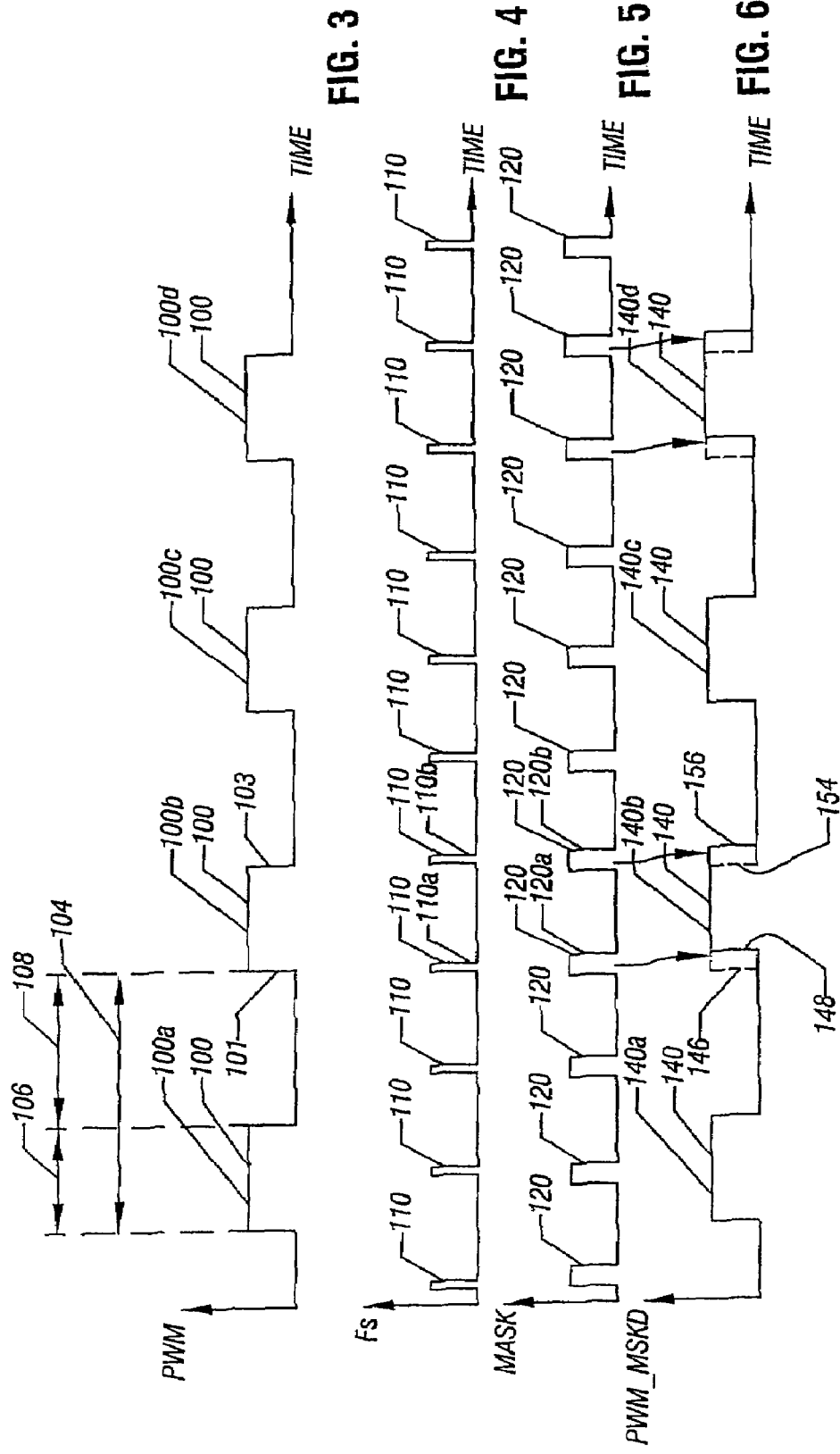

MANAGEMENT OF REGULATOR-INDUCED SWITCHING NOISE FOR SAMPLED SYSTEMS

CROSS REFERENCE TO RELATED PATENT APPLICATIONS

The present application claims priority from, and is a divisional of, U.S. patent application Ser. No. 11/240,745 filed on Sep. 30, 2005, assigned to the assignee of the present invention, the disclosure of which is herein specifically incorporated by this reference in its entirety.

BACKGROUND

The invention generally relates to management of regulator-induced switching noise for sampled systems.

It is not uncommon for a highly integrated circuit to have a large number of analog blocks and subsystems. One of these blocks/subsystems may be a DC-to-DC voltage regulator, a circuit that converts a DC input voltage to either a higher or a lower DC output voltage to power other blocks/subsystems of the integrated circuit.

One type of voltage regulator is a switching regulator, which is often chosen due to its relatively smaller size and better efficiency than other types of regulators. The switching regulator typically includes an inductor (a stand-alone inductor or an inductor formed from a transformer, as examples) and one or more switches that the regulator opens and closes in a controlled manner to transfer energy between an input voltage source, the inductor and the regulator's output terminal to regulate an output voltage.

SUMMARY

In an embodiment of the invention, a system includes a sampler that is adapted to sample an input signal and a switching regulator that is separate from the sampler. The switching regulator is adapted to regulate a switching operation of the regulator in response to the sampling by the sampler.

In another embodiment of the invention, a voltage regulator includes an input terminal, an output terminal, an energy storage element, at least one switch and a controller. The input terminal receives an input voltage, and the output terminal provides an output voltage. The switch(es) are coupled to the energy storage element, the input terminal and the output terminal. The controller is adapted to operate the switch(es) to energize and de-energize the energy source element to regulate the output voltage. The controller is adapted to control the operation of the switch(es) to prevent a sampler from sampling noise generated by the voltage regulator.

In yet another embodiment of the invention, a technique includes regulating a switching operation of a switching regulator in response to sampling by a sampler to control a timing of noise that is generated by the switching regulator.

Advantages and other features of the invention will become apparent from the following drawings, description and claims.

BRIEF DESCRIPTION OF THE DRAWINGS

FIG. 1 is a block diagram of a system according to an embodiment of the invention.

FIG. 2 is a schematic diagram of a DC-to-DC switching regulator of FIG. 1 according to an embodiment of the invention.

FIGS. 3, 4, 5 and 6 are exemplary waveforms that illustrate operation of the switching regulator according to an embodiment of the invention.

DETAILED DESCRIPTION

Figure 7:
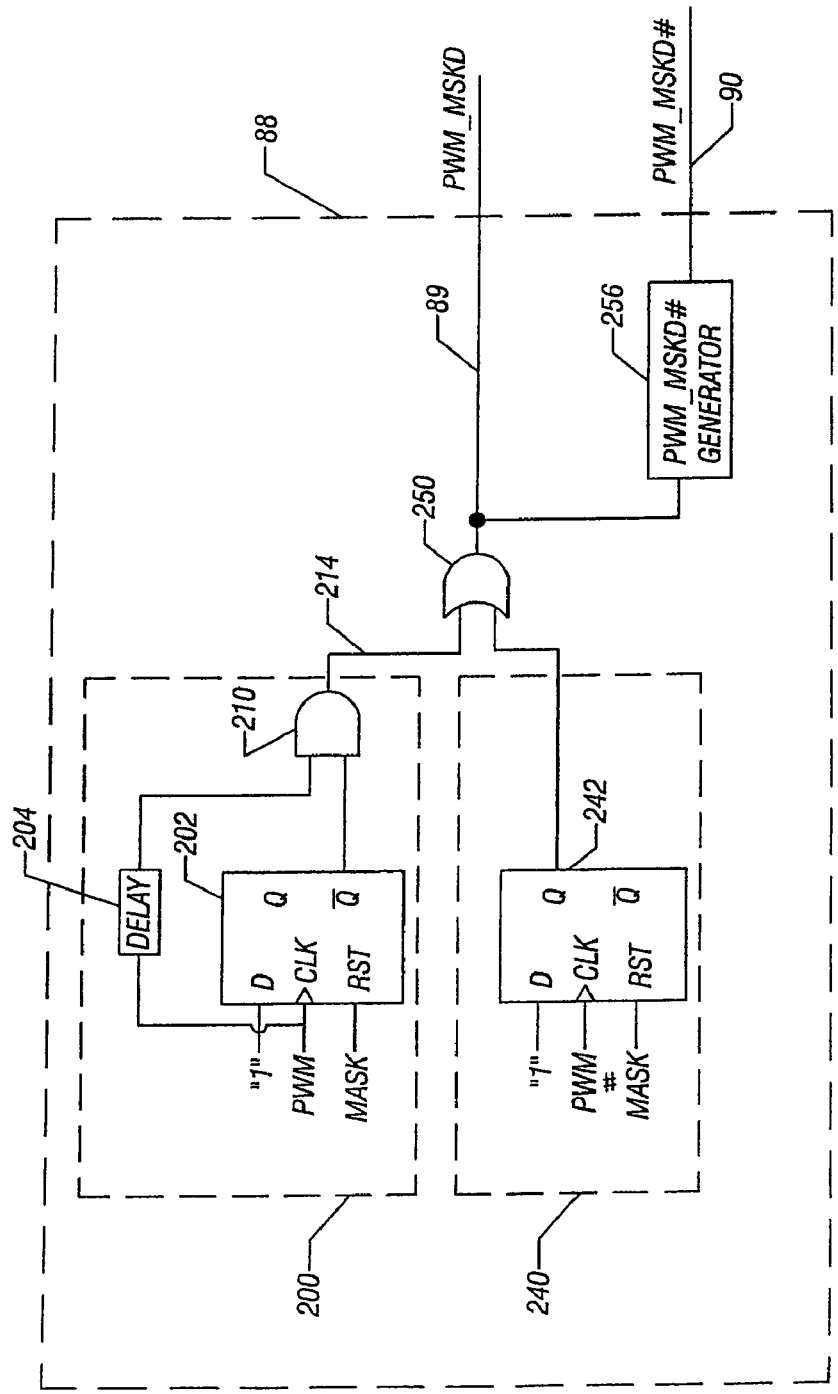
FIG. 7 is a schematic diagram of a noise management circuit of the switching regulator according to an embodiment of the invention.

The blocks and subsystems of a highly integrated, integrated circuit may interfere with each other due to various coupling mechanisms that permit noise that is generated in a particular block/subsystem to propagate to other parts of the integrated circuit. These coupling mechanisms include, for example, supply voltages and wells in which the blocks and subsystems are fabricated, since the supply voltages may be routed to multiple blocks and subsystems and the wells may be fabricated on the same die. As a more specific example, FIG. 1 depicts an integrated circuit 5 that includes a supply rail 14 that furnishes a supply voltage (called "$V_{IN}$" in FIG. 1). The $V_{IN}$ voltage may be derived, for example, from a battery voltage and may be distributed throughout the integrated circuit 5, which effectively couples blocks/subsystems of the integrated circuit 5 together. The $V_{IN}$ voltage may be converted into other voltage levels by various regulators of the integrated circuit 5, such as a DC-DC switching regulator 10, which converts the $V_{IN}$ voltage into a supply voltage (called "$V_{DD}$" in FIG. 1) that appears on a supply rail 16 and powers certain circuitry 25 (a frequency synthesizer or a microcontroller unit, as examples) of the integrated circuit 5. Thus, certain blocks and subsystems of the integrated circuit 5 may also be coupled together due to receipt of the $V_{DD}$ supply voltage. Due to the coupling of the switching regulator 10 to both the $V_{IN}$ and $V_{DD}$ voltages, it is possible that noise that is generated by the regulator 10 may propagate along the rails 14 and 16 to other parts of the integrated circuit 5 and thus, may interfere with some blocks and subsystems of the integrated circuit 5.

FIG. 1 depicts an exemplary subsystem 20 (of the integrated circuit 5), which has the potential of being affected by noise that is produced by the switching regulator 10. If not for noise management features of the switching regulator 10 that are described herein, it is possible that switching noise that is generated by the switching regulator 10 may interfere with the operation of the subsystem 20.

As a more specific example, the switching regulator 10 may generate switching noise each time a switch of the switching regulator 10 transitions between open (alternatively called "on") and closed (alternatively called "off") states. The sharp edge of the resulting switching current may cause the $V_{IN}$ voltage (as an example) to communicate noise to the subsystem 20 in the form of a "ring signal" due to bond wire inductance; and the amplitude of the ring signal may be significant, such as on the order of millivolts.

Furthermore, due to the above-described switching operation of the regulator 10, the resulting large voltage swing of a switching node of the switching regulator 10 may pump enough charge into a well (an n-well, for example) in which the subsystem 20 is fabricated to cause the voltage of the well to bounce. Additionally, the switching regulator 10 may periodically have a large output current that may cause the supply rail 14 to have periodic drops in voltage due to parasitic resistance.

The subsystem 20 includes at least one component, depicted by a sampler, or sampling circuit 30, in FIG. 1, which samples an input signal, such as an analog voltage (called "V$_A$" in FIG. 1), to produce a resultant sampled voltage (called "V$_S$" in FIG. 1). More particularly, the sampling circuit 30 may receive a sampling clock signal (called "F$_s$," in FIG. 1) that includes pulses to trigger the sampling by the sampling circuit 30. As examples, the sampling circuit 30 may be an analog-to-digital converter, a switched capacitor filter or any other circuit that samples a signal to produce sampled values of the signal.

The sampling circuit 30 is coupled to the switching regulator 10. Thus, the sampling circuit 30 may be fabricated in the same well as the regulator 10, may receive the V$_{IN}$ supply voltage, may be coupled to the V$_{IN}$ supply rail 14, etc. Therefore, the above-described potential switching noise from the switching regulator 10 may produce resultant noise in the V$_S$ sampled signal due to the following relationships. Assume, for purposes of example, that the switching frequency of the switching regulator 10 is "f$_{sw}$," the sampling clock frequency is "f$_s$," and the bandwidth of the V$_S$ signal is "f$_B$." Any harmonics of f$_{sw}$ and f$_s$ that are separated by less than the f$_B$ bandwidth introduce DC offset or tones within the signal bandwidth of the V$_S$ sampled signal due to an aliasing effect. Therefore, one solution to reduce the appearance of an offset or tone within the signal bandwidth is to choose f$_{sw}$ relative to f$_s$ to satisfy the following relationship:

$$|M \cdot f_{sw} - N \cdot f_s| > f_B \qquad \text{Equation 1}$$

If the above-described relationship is not satisfied, then a timing of the switching operation of the switching regulator 10 may be controlled for purposes of preventing noise from the switching regulator 10 from propagating into signals that are generated by the sampled system 20. More particularly, in accordance with some embodiments of the invention, the switching regulator 10 delays a switching event (such as the transition of a switch between open and closed states, for example) when the switching event would otherwise coincide with a time at which the sampling circuit 30 is sampling.

As a more specific example, in accordance with some embodiments of the invention, a clock generator 22 (that also generates the F$_S$ signal) of the sampling system 20 generates a signal (called "MASK," in FIG. 1) for purposes of indicating (to the switching regulator 10) when the sampling circuit 30 is sampling. If a particular switching event is scheduled to occur in the vicinity of a sampling time, then the switching regulator 10 delays the switching event to a time past the vicinity of the sampling time.

FIG. 2 depicts an embodiment of the switching regulator 10 in accordance with an embodiment of the invention. In this embodiment of the invention, the switching regulator 10 has a Buck regulator core 40 that receives the V$_{IN}$ voltage from the supply rail 14 and provides the corresponding regulated V$_{DD}$ voltage to the supply rail 16. The core 40 includes a switch, such as an n-channel metal-oxide-semiconductor field effect transistor (NMOSFET) 54, which has its drain-to-source path coupled between the supply rail 14 and a switching node 60. Another switch of the core 40, such as an NMOSFET 64, has its drain-to-source path coupled between the switching node 60 and ground. Thus, the drain-to-source path of the NMOSFET 64 may be coupled between the switching node 60 and ground. The core 40 also includes an energy storage element, such as an inductor 66 (a stand-alone inductor or a winding of a transformer, as examples), which is coupled between the switching node 60 and the supply rail 16. A bulk, or filtering, capacitor 68 is coupled between the supply rail 16 and ground.

In addition to the core 40, the switching regulator 10 includes a controller 80 that controls the switching actions of the NMOSFETs 54 and 64 to regulate the V$_{DD}$ output voltage. More specifically, neglecting for now the noise management features of the regulator 10 (further described below), a pulse width modulation (PWM) controller 84 of the controller 80 generates a pulse width modulated switching control signal (called "PWM" in FIG. 2) to control operation of the NMOSFET 54. The PWM controller 84 also generates a switching signal (called "PWM#," in FIG. 2) to control operation of the NMOSFET 64. The PWM# signal is assumed herein to be complimentary to the PWM switching signal and is generally not described below separate from the PWM signal. Thus, when the PWM signal is driven high the PWM# signal is driven low and vice versa.

Referring to FIG. 3 in conjunction with FIG. 2, the PWM controller 84 receives feedback (via one or more feedback terminals 81) and controls the switching operation of the NMOSFETs 54 and 64 to regulate the V$_{DD}$ output voltage in the following manner. The PWM controller 84 controls the PWM signal in switching cycles, such as an exemplary switching cycle 104 that is depicted in FIG. 3. The switching cycle 104 includes an on time interval 106 and an off time interval 108.

During the on time interval 106, the PWM controller 84 asserts, or drives high, the PWM signal, as depicted by the corresponding pulses 100 (pulses 100a, 100b, 100c and 100d, being depicted as examples) in the PWM switching signal. Each pulse 100 causes the NMOSFET 54 to turn on (i.e., "close"), and due to the complimentary nature of the PWM# signal, the NMOSFET 64 turns off (i.e., "opens"). Therefore, due to this arrangement, during the pulse 100 energy flows from the supply rail 14 and is stored in the inductor 66 to energize the inductor 66. During the subsequent off time interval 108, the pulse 100 disappears to cause the NMOSFET 54 to turn off and the NMOSFET 64 to turn on (due to the assertion of the PWM# signal) to couple the switching node 60 to ground. During the off time interval 108, the inductor 66 is de-energized to communicate energy to the load of the regulator 10, as current flows through the inductor 66 to ground.

The PWM control 84 controls the switching cycles to regulate the V$_{DD}$ output voltage. For purposes of example, it is assumed the regulator 10 operates in a continuous mode of operation. By controlling a ratio, called the "duty cycle," of the on time interval 106 to the duration of the switching cycle 104, the PWM controller 84 may regulate the V$_{DD}$ output voltage. For the Buck core 40, the V$_{DD}$ output voltage is lower than the V$_{IN}$ input voltage and, in general, is proportional to the product of the duty cycle and the V$_{IN}$ input voltage. Assuming a constant period for the switching cycles, by increasing the duration of the on time interval 106, the PWM controller 84 may raise the V$_{DD}$ output voltage; and conversely, by decreasing the duration of the on time interval 106, the PWM controller 84 may decrease the V$_{DD}$ output voltage.

It is noted that many other variations are possible and are within the scope of the appended claims. For example, it is assumed above that the switching cycle 104 has a fixed duration, and the duration of the on time interval 106 is modulated to regulate the V$_{DD}$ output voltage. However, in other embodiments of the invention, other parameters may be varied. For example, in other embodiments of the invention, the PWM controller 84 may modulate the duration of the switching interval 104 and/or modulate the off time interval 108 for purposes of regulating the V$_{DD}$ output voltage. Additionally, although a Buck regulator topology is depicted in FIG. 2, other topologies, such as a flyback, a Boost, a Buck/Boost (as examples), etc. may be used in other embodiments of the invention. As yet another example of an additional embodiment of the invention, the NMOSFET 64 (and the associated control circuitry that generates the PWM# signal) may be replaced by a diode (a Schottky diode, for example). In this regard, the cathode of the diode may be coupled to the switching node 60, and the anode of the diode may be coupled to ground. As another example, the NMOSFET 54 may be replaced by PMOSFET. Thus, many variations are possible and are within the scope of the appended claims.

Referring to FIG. 2, instead of using the PWM controller 84 to directly drive the NMOSFETs 54 and 64, the switching regulator 10 includes a noise management circuit 88, a circuit that controls the switching operation of the switching regulator 10 so that switching events of the regulator 10 do not coincide with the sampling by the sampling circuit 30 (see FIG. 1). The noise management circuit 88 receives the PWM and PWM# signals from the PWM controller 84 and selectively masks (as described below) these signals to generate signals (called "PWM_MSKD" and "PWM_MSKD#," as depicted in FIG. 2), respectively, to drive the NMOSFETS 54 and 64. Thus, the PWM_MSKD signal is received at the gate terminal of the NMOSFET 54, and the PWM_MSKD# signal is received at the gate terminal of the NMOSFET 64. The PWM_MSKD# signal is complimentary to the PWM_MSKD signal and is generally not described below separate from the PWM_MSKD signal.

In general, if edges (i.e., falling or rising edges) in the PWM and PWM# signals do not occur in the vicinity of a sampling time, the noise management circuit 88 passes the PWM and PWM# signals through without timing adjustments to generate the PWM_MSKD and PWM_MSKD# signals, respectively. However, if edges of the PWM and PWM# signals occur in the vicinity of a scheduled sampling time, then the noise management circuit 88 delays these edges; and thus, for these cases, the PWM_MSKD and PWM_MSKD# signals are delayed versions of the PWM and PWM# signals, respectively.

To further illustrate operation of the noise management circuit 88, FIG. 4 depicts the $F_S$ clock signal, FIG. 5 depicts the MASK signal, and FIG. 6 depicts the PWM_MSKD signal. Referring to FIGS. 2-6, the $F_S$ clock signal contains pulses 110 (such as exemplary pulses 110a and 110b), each of which triggers the sampling circuit 30 (see FIG. 1) to sample the $V_A$ signal. The MASK signal (depicted in FIG. 5) has pulses 120 that generally coincide in time with the pulses 110. However, the pulses 120 (such as exemplary pulses 120a and 120b) have longer durations, in that each pulse 120 begins at a time slightly before the beginning of the corresponding $F_S$ pulse 110, and each pulse 120 ends at a time slightly after the end of the corresponding pulse 110. Thus, each pulse 120 compensates for a sufficient interval of time around a scheduled sampling time.

The PWM_MSKD signal contains pulses 140 (such as exemplary pulses 140a, 140b, 140c and 140d) that generally correspond to the pulses 100 of the PWM (see FIG. 3) signal. More particularly, if no switching event occurs near the falling or rising edge of a particular pulse 100 of the PWM signal, then the corresponding pulse 140 of the PWM_MSKD signal is identical to the pulse 100. However, if a switching event occurs in the vicinity of the falling or rising edge of a particular PWM pulse 100, then the noise management circuit 88 delays the falling and/or rising edge of the corresponding PWM_MSKD pulse 140.

The selective delaying of the PWM signal is depicted by way of a more specific example by the pulse 100b of the PWM signal (FIG. 3) and the corresponding pulse 140b of the PWM_MSKD signal (FIG. 6). As shown, a rising edge 101 of the PWM pulse 100b is in the vicinity of the pulse 110a of the $F_S$ clock signal (FIG. 4). In response to this event, the noise management circuit 88 delays the rising edge of the PWM_MSKD pulse 140b. It is noted that if the rising edge 101 did not occur in the vicinity of a scheduled sampling time, the PWM_MSKD pulse 140b would have a rising edge 146. However, due to the vicinity of the rising edge 101 to the occurrence of the pulse 110a, the noise management circuit 88 delays the rising edge 146 to produce a rising edge 148 for the PWM_MSKD pulse 140a, which is delayed in time.

Continuing the example, a falling edge 103 of the PWM pulse 100b coincides with a pulse 110b of the $F_S$ clock signal. Thus, if the falling edge 103 were not in the vicinity of a sampling time, the pulse 140b would have a falling edge 154 as depicted in FIG. 6. However, due to the vicinity of the sampling time, the noise management circuit 88 delays the falling edge 154 so that the pulse 140b has a delayed falling edge 156.

In operation, the noise management circuit 88 responds to the MASK signal (FIG. 5) for purposes of delaying/not delaying the switching edges of the PWM and PWM# signals. By way of example, as depicted in FIG. 6, the noise management circuit 88 delays the otherwise rising edge 146 of the PWM_MSKD pulse 140b by the duration of the pulse 120a of the MASK signal; and the noise management circuit 88 delays the otherwise falling edge 154 of the PWM_MSKD pulse 140b by the duration of the pulse 120b to produce the falling edge 156 of the pulse 140b.

The noise management circuit 88 does not necessarily delay the falling and/or rising edge of each pulse 140 if the edge does not coincide with a sampling time. Thus, two pulses 140a and 140c of the PWM_MSKD signal are depicted as not being delayed (as compared to the corresponding PWM pulses 100a and 100c, respectively, of the PWM signal (FIG. 3)). FIG. 6 depicts another exemplary pulse 140d in which the rising and falling edges are delayed (as compared to the corresponding PWM pulse 100d) due to the vicinity of the corresponding edges of the PWM pulse 100d occurring in the vicinity of scheduled sampling times.

FIG. 7 depicts an exemplary embodiment of the noise management circuit 88 in accordance with some embodiments of the invention. The noise management circuit 88 includes a circuit 200 to control the rising edges of the PWM_MSKD signal (see FIG. 6) and the falling edges of the PWM_MSKD# signal; and a circuit 240 to control the falling edges of the PWM_MSKD signal and the rising edges of the PWM_MSKD# signal.

In some embodiments of the invention, the circuit 200 includes a D-type flip-flop 202 that has a clock input terminal that receives the PWM signal. A reset terminal of the flip-flop 202 receives the MASK signal, and the signal input terminal of the flip-flop 202 is connected to a logic one level. Due to this arrangement, the inverting output terminal of the flip-flop 202 has a logic one state when the MASK signal has a logic zero state (i.e., the inverting terminal has a logic one state in the absence of a pulse 120 (FIG. 5) in the MASK signal). When the pulse 120 (FIG. 5) is received at the reset input terminal, the inverting output terminal of the flip-flop 202 assumes a zero logic level in the event of a rising edge of the PWM signal. Therefore, in the event of a pulse 120 in the MASK signal and if the PWM rising edge falls into the duration of pulse 120, the flip-flop 202 has the effect of delaying any otherwise concurrently-occurring rising edge of the PWM signal.

Also depicted in FIG. 7, the circuit 200 includes a delay element 204 that is coupled between the clock input terminal of the flip-flop 202 and an input terminal of an AND gate 210. The other terminal of the AND gate 210 is coupled to the inverting output terminal of the flip-flop 202. The purpose of the delay element 204 is to compensate for the delay of the flip-flop 202 in responding to the PWM signal. An output terminal 214 of the AND gate 210 provides the output terminal of the circuit 200.

In some embodiments of the invention, the circuit 240 includes a D-type flip-flop 242. The clock input terminal of the flip-flop 242 receives the PWM# signal, the signal input at the flip-flop 242 receives a logic one signal, and a reset terminal of the flip-flop 242 receives the MASK signal. Thus, the flip-flop 242 is clocked on the falling edges of the PWM signal. The non-inverting output terminal of the flip-flop 242 provides a signal indicative of the falling edges of the pulse 140. Thus, in the absence of the MASK signal pulse 120, the non-inverting output terminal of the flip-flop 242 is de-asserted, and the signal on the output terminal of the AND gate 210 passes on through to be the PWM_MSKD signal. However, upon occurrence of the MASK signal pulse 120 and if the falling edge of PWM (rising edge of PWM#) coincides with duration of pulse 120, the de-assertion of the pulse 140 is delayed.

As depicted in FIG. 7, the noise management circuit 88 may also include an OR gate 250, which has one input terminal connected to the output terminal 214 of the AND gate 214; and another input terminal of the OR gate 250 is coupled to the non-inverting output terminal of the flip-flop 242. An output terminal 89 of the OR gate 250 provides the PWM_MSKD signal.

FIG. 7 also depicts a PWM_MSKD# generator circuit 256 in accordance with some embodiments of the invention. The generator 256 receives the PWM_MSKD signal and produces the PWM_MSKD# signal at its output terminal 90. In general, the generator 256 functions as an inverter to invert the PWM_MSKD# signal. In some embodiments of the invention, the generator 256 may also contain circuitry to ensure that the edges of the PWM_MSKD and PWM_MSKD# signals do not overlap. Other variations are possible and are within the scope of the appended claims.

Figure 8:
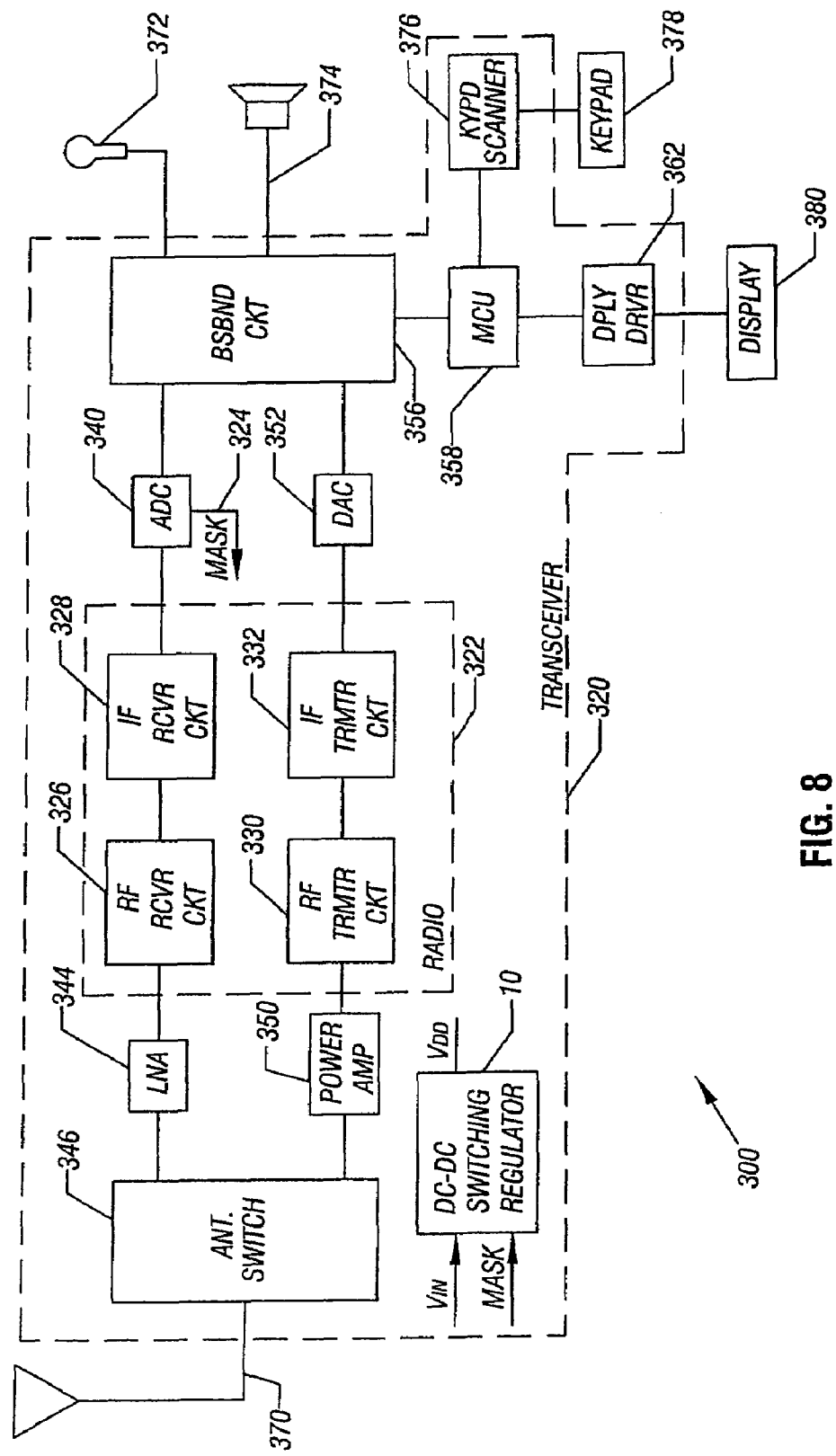
FIG. 8 is a schematic diagram of a wireless system according to an embodiment of the invention.

Referring to FIG. 8, in accordance with some embodiments of the invention, the switching regulator 10 may be used in connection with a wireless system 300 (such as a cellular telephone or personal digital assistants (PDAs), as examples). In particular, in accordance with some embodiments of the invention, the regulator 10 may provide one or more supply voltages for components of a radio 322 of the wireless system 300.

The radio 322 is part of a transceiver 320 that may, for example, serve as a cellular telephone transceiver, in some embodiments of the invention. In addition to the radio 322, the regulator 10 may supply power to other components of the transceiver 320, such as an analog-to-digital converter (ADC) 340, a digital-to-analog converter (DAC) 352, baseband circuitry 356, a microcontroller unit (MCU) 358, a keypad scanner 376, a display driver 362, an antenna switch 346, a low noise amplifier (LNA) 344 and a power amplifier (350).

The ADC 340 is one example of a sampled subsystem that may provide the MASK signal (at a terminal 324) to the regulator 10. The transceiver 320 may include other components (such as a switched capacitor filter, a mixer, etc.) that provide MASK signals for purposes of controlling switching operations of the regulator 10 for improved noise performance.

In general, the radio 322 may include a radio frequency (RF) receiver circuit 326 that receives an RF signal from a low noise amplifier (LNA) 344. The RF receiver circuit 326 may translate the RF signal to an intermediate frequency (IF) signal that is provided to an IF receiver circuit 328. In accordance with some embodiments of the invention, the IF receiver circuit 328 may provide a baseband signal that is converted into digital form by the ADC 340. As depicted in FIG. 8, the ADC 340 may be coupled to a baseband processing circuit 356.

The radio 322 may also include, for purposes of transmitting, an IF transmitter circuit 322 that receives an analog signal from a digital-to-analog converter (DAC) 352. The IF transmitter circuit 322 translates the analog signal, at a baseband frequency, into an RF signal that is processed by an RF transmitter circuit 330. The output signal from the RF transmitter circuit 330 may be provided to, for example, a power amplifier 350.

Among the other features of the wireless system 300, as depicted in FIG. 8, the LNA 344 and the power amplifier 350 may be coupled to an antenna switch 346 that, in turn, is coupled to an antenna 370 for the wireless system 300. The baseband circuitry 356 may receive an analog speech signal from a microphone 372 and may furnish, for example, an audio output signal to a speaker 374. Additionally, the MCU 358 may be coupled to the baseband circuit 356 to control the general operation of the transceiver 320. The transceiver 320 may also include a keypad driver 376 and a display driver 362 that are coupled to the MCU 358. The display driver 362 drives a display 380; and the keypad driver 376 drives a keypad 378.

In some embodiments of the invention, the transceiver 320 may be formed on a single die in a single semiconductor package. However, in other embodiments of the invention, the transceiver 320 may be formed on multiple dies in a single semiconductor package. In yet other embodiments of the invention, the transceiver 320 may be formed in multiple semiconductor packages. Thus, many variations are possible and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A voltage regulator comprising:
   an input terminal to receive an input voltage;
   an output terminal to provide an output voltage;
   an energy storage element;
   at least one switch coupled to the energy storage element, input terminal and output terminal; and
   a controller adapted to:
      operate said at least one switch to energize and de-energize the energy storage element to regulate the output voltage of the voltage regulator, and
      control the operation of said at least one switch to prevent a sampler from sampling noise generated by the voltage regulator by selectively delaying the operation of said at least one switch if PWM edges of the voltage regulator coincide with sampling edges of the sampler.

2. The voltage regulator of claim 1, wherein the sampler is separate from the voltage regulator.

3. The voltage regulator of claim 1, wherein the controller is adapted to generate a first signal to operate said at least one switch to regulate the output voltage.

4. The voltage regulator of claim 3, wherein the first signal transitions between a first level to energize the storage element and a second level to de-energize the storage element, and the controller is adapted to control transitions between the first and second levels in response to the operation of the sampler.

5. The voltage regulator of claim 4, wherein the controller is further adapted to control the transitions to regulate the output voltage.

6. The voltage regulator of claim 4, wherein the controller is adapted to mask transitions in the first signal between the first and second levels in response to a second signal provided by the sampler.

7. The voltage regulator of claim 6, wherein the second signal comprises a pulse train comprising pulses indicative of the sample times, and the controller is adapted to selectively delay the first signal to prevent transitions between the first and second levels in the first signal occurring concurrently with the pulses.

8. A voltage regulator in a system comprising:
   a PWM controller for providing first and second PWM signals;
   a noise management circuit for receiving the first and second PWM signals and for generating first and second masking signals;
   an input node for receiving an input voltage;
   an output node for providing a regulated output voltage;
   an intermediate node;
   a first switch having a current path coupled between the input node and the intermediate node, and being controlled by the first masking signal;
   a second switch having a current path coupled between the intermediate node and ground, and being controlled by the second masking signal; and
   an energy storage element coupled between the intermediate node and the output node.

9. The voltage regulator of claim 8 wherein the operation of the first switch is delayed by the first masking signal if PWM edges of the voltage regulator coincide with sampling edges of a system sampler.

10. The voltage regulator of claim 8 wherein the operation of the second switch is delayed by the second masking signal if PWM edges of the voltage regulator coincide with sampling edges of a system sampler.

11. The voltage regulator of claim 8, wherein the first switch comprises an N-channel MOS transistor.

12. The voltage regulator of claim 8, wherein the second switch comprises an N-channel MOS transistor.

13. The voltage regulator of claim 8, wherein the energy storage element comprises an inductor coupled between the intermediate node and the output node.

14. The voltage regulator of claim 8, wherein the energy storage element comprises a capacitor coupled between the output node and ground.

15. A method of operating a voltage regulator in a system comprising:
   providing first and second PWM signals;
   generating first and second masking signals from the first and second PWM signals;
   receiving an input voltage at an input node;
   providing a regulated output voltage at an output node;
   providing an intermediate node;
   coupling the current path of a first switch between the input node and the intermediate node, and controlling the first switch with the first masking signal;
   coupling the current path of a second switch between the intermediate node and ground, and controlling the second switch with the second masking signal; and
   coupling an energy storage element between the intermediate node and the output node.

16. The voltage regulator of claim 15 further comprising delaying the operation of the first switch with the first masking signal if PWM edges of the voltage regulator coincide with sampling edges of a system sampler.

17. The voltage regulator of claim 15 further comprising delaying the operation of the second switch with the second masking signal if PWM edges of the voltage regulator coincide with sampling edges of a system sampler.

18. The voltage regulator of claim 15, wherein the first switch comprises an N-channel MOS transistor.

19. The voltage regulator of claim 15, wherein the second switch comprises an N-channel MOS transistor.

20. The voltage regulator of claim 15, wherein the energy storage element comprises an inductor coupled between the intermediate node and the output node.

21. The voltage regulator of claim 15, wherein the energy storage element comprises a capacitor coupled between the output node and ground.

* * * * *